TRANSMITTED AND REFLECTED COMPONENTS BOTH 3DB DOWN FROM THE INPUT BEAM

INVENTOR
C. G. B. GARRETT
ATTORNEY

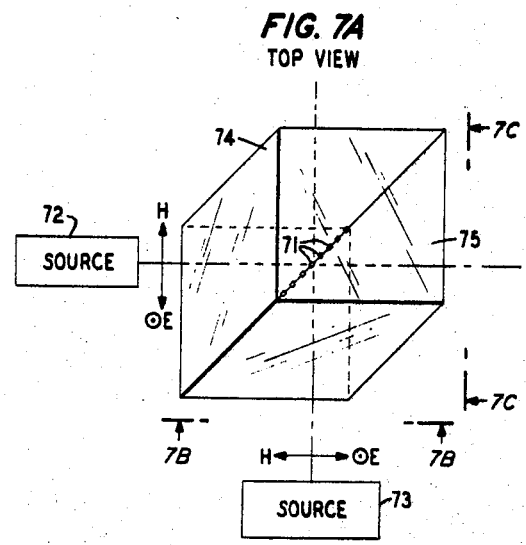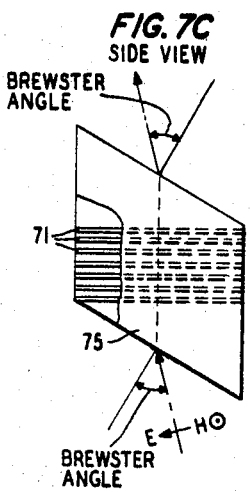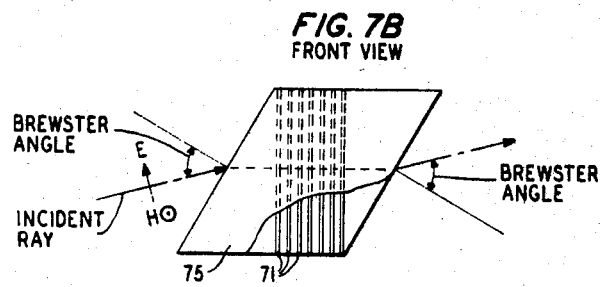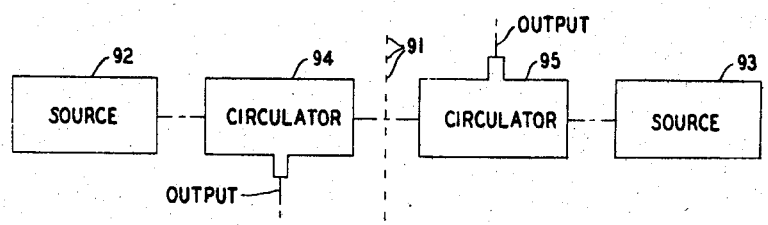

United States Patent Office 3,436,143
Patented Apr. 1, 1969

3,436,143
GRID TYPE MAGIC TEE
Charles G. B. Garrett, Morristown, N.J., assignor to Bell Telephone Laboratories, Incorporated, New York, N.Y., a corporation of New York
Filed Nov. 30, 1965, Ser. No. 510,655
Int. Cl. G02b 5/30, 27/28
U.S. Cl. 350—147         8 Claims This invention relates to devices for combining radiations, particularly radiations in the infrared or far infrared portions of the electromagnetic spectrum.

A variety of recent proposals have been directed to communication in the visible, infrared and far infrared portions of the electromagnetic spectrum. These proposals have been concentrated upon such components as oscillators, amplifiers, modulators, frequency shifters and focusing devices for use in such communication.

Nevertheless, a number of other devices are needed for the successful implementation of such a communication system. Among these are devices for combining two input radiations to provide, for example, the sum and difference of the amplitude-phase vectors of the two input radiations of like frequency. The difference output, for in-phase radiations, would be useful in null-balanced systems; and the sum output, for in-phase radiations, would be useful for automatic gain control arrangements to prevent the saturation of multichannel amplifiers. In the more general case of a vector sum or difference, a comparison of the sum and difference radiations would permit the determination of their input amplitudes or their input relative phase, given any one of these three quantities.

Such a device is sometimes called a "magic tee." Nevertheless, there is no existing device of this type that is suitable for infrared radiation, particularly unguided infrared radiation.

An object of my invention therefore, is a device for providing the amplitude-phase vector sum and difference of two input radiations of like frequency in the infrared and far infrared portion of the spectrum.

My invention resides in my recognition that the amplitude-phase vector sum and difference of two like-polarized input beams of radiation of this kind can be provided by a thin lossless metallic grid oriented to receive both beams at like angles $\theta$ of incidence upon opposite sides of the grid, the reflected portion of one being in line with the transmitted portion of the other. It is a characteristic of the invention that the transmitted and reflected portions of each input beam are equal in amplitude i.e. that the power of each input beam is split into two halves without diffraction side lobes, and that the width $d$ and center-to-center spacing $a$ of the elongated parallel grid elements are within technical realizable limits.

Specifically, according to a feature of my invention, the ratio of the input wavelength $\lambda$, to the element center-to-center spacing $a$ lies in the range.

$$1+\sin\theta < \lambda/a < 9\cos\theta \qquad (1)$$

the ratio of $a$ to the grid parameter D satisfying a relationship specified hereinafter, wherein the grid parameter D is the element width $d$ when the grid elements are elongated parallel to the polarization of the beams and is the gap $(a-d)$ when the grid elements are elongated orthogonally to the polarization of the beams.

It should be noted that the polarization described in the preceding paragraph is the polarization of the electric field vector of the radiation. It is possible to use either polarization with respect to the direction of elongation of the grid elements, provided the grid is formed in the correspondingly appropriate manner; but in all cases the direction of elongation of the grid elements should be orthogonal to the plane of incidence where that plane is the plane defined by the normal to the grid and the direction of propagation of the input beam as it strikes the grid.

A more complete understanding of my invention may be obtained from the following detailed description, taken together with the drawing, in which.

Figure 5:
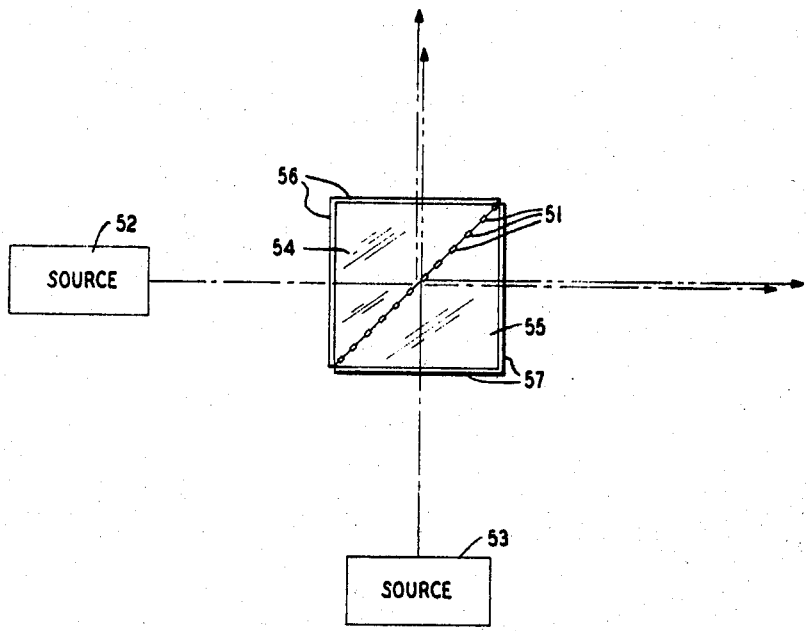
FIG. 5 is partially a schematic top view and partially a block diagrammatic showing of another embodiment of the invention employing dielectric supporting material for the metallic grid.

FIGS. 7A, 7B, and 7C show, respectively, top, front, and side pictorial views of another modification of the embodiment of FIG. 5, also using Brewster-angle entrance and exit faces, and FIG. 8 shows another embodiment of the invention employing normal incidence of the beams upon the grid.

A brief explanation of the theoretical basis of the invention will be useful in understanding the various embodiments and their operation.

When radiation is incident upon an array of elongated parallel conducting elements that are relatively thin in a direction normal to the array, characteristic phase shifts between the incident, reflected and transmitted waves occur at the plane of such a grid in order to satisfy electric field and magnetic field boundary conditions. This is true for infrared and far infrared radiations, as well as visible and microwave radiations.

The prior art development of grids for use as microwave polarizing elements has treated those with elements elongated in a direction parallel to the electric field polarization as inductive grids and those with elements elongated in a direction orthogonal to the electric field polarization as capacitive grids. It has been shown that to obtain similar performance from the two types of grids the ratio of center-to-center spacing $a$, to the element width, $d$, for an inductive grid should be the same as the ratio of center-to-center spacing, $a$, to the gap, $(a-d)$, between the elements for a capacitive grid. For the respective types of grids, the parameters $d$ and $(a-d)$ may be referred to as the grid parameter D.

For the case of a partially reflective and partially transmissive grid, let us define the following vector relationship:

$$1+\vec{r}=\vec{t} \qquad (2)$$

where $\vec{r}$ is the reflectance and $\vec{t}$ is the transmittance of the grid.

For a grid employed according to my invention, I require that;

$$|\vec{r}|=|\vec{t}| \qquad (3)$$

that is, the magnitudes of reflectance and transmittance must be equal in order for an input beam to be split equally between the reflected and transmitted components thereof.

Figure 2:
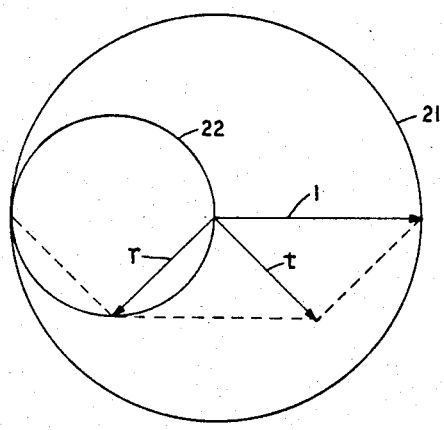
FIG. 2 shows a diagram of reflectance and transmittance relationships for a lossless metallic grid.

A graphic construction that is useful in illustrating this relationship in shown in FIG. 2. A circle 21 is drawn with unit radius representing the input beam. To establish the reference amplitude and phase, a unit vector is directed from the center of the circle to a point on the right-hand portion of the circle. Next, between the diametrically opposite point and the center, a circle 22 of unit diameter is constructed. This circle 22 enables us to maintain the necessary 90° or quadrature relationship between the reflectance and transmittance by inscribing them in a semicircular portion theerof and also enables us to satisfy the requirement that, for a perfectly reflecting grid ($\vec{t}=0$), an input wave suffers a 180° phase reversal upon reflection. It may be seen that for $|\vec{r}|=|\vec{t}|$, the $\vec{r}$ vector is inscribed in the semicircle at −135°, or −(180°−45°), with respect to the unit vector. A parallelogram is completed to obtain $\vec{t}$ as the vector sum of $\vec{r}$ and the unit vector.

Figure 1:
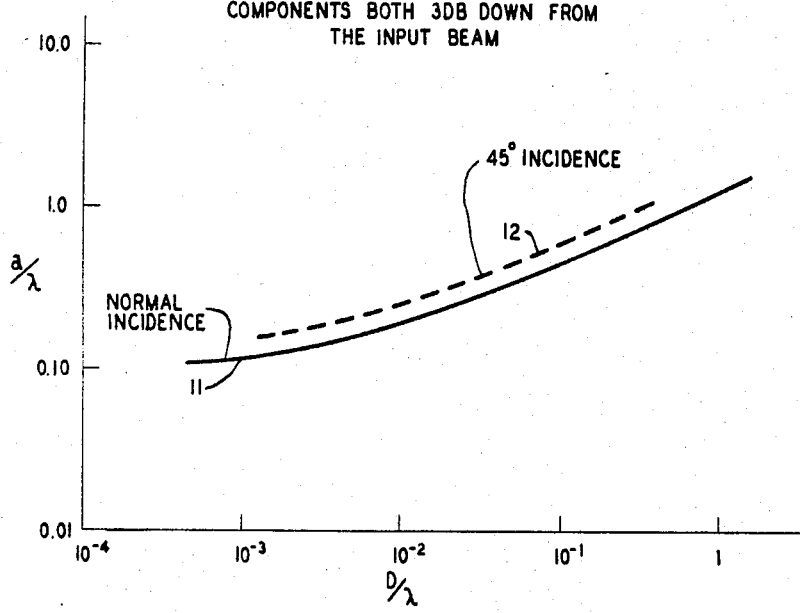
FIG. 1 shows curves describing the relationship of the properties of a metallic grid for employment according to my invention.

From the principles illustrated graphically in FIG. 2 and from certain other technical considerations, one can derive the necessary properties of the grid in order to obtain the required relationships between reflectance and transmittance. In particular the relevant limits on the ratio of wavelength, λ, to center-to-center spacing $a$ is given in the introduction above as Equation 1. It should be noted that the wavelength λ in Equation 1 is the wavelength in the supporting dielectric medium when the grid is supported by such a medium. A graph of the relationship of $D/\lambda$ to $a/\lambda$ is shown in FIG. 1 as curve 12 for the case of 45° incidence of the input beams. In order that the values for other angles of incidence may be more easily calculated the curve for normal incidence, which produces equal transmitted and reflected components, is shown as curve 11 of FIG. 1. It should be further noted that for non-normal incidence the direction of elongation of the grid elements should be orthogonal to the plane of incidence, i.e., the plane of the angle $\theta$.

The following are representative values of curves 11 and 12, generalized to take into account variation in the angle of incidence $\theta$:

| $a \cos \theta/\lambda$ | $D \cos \theta/\lambda$ |
|---|---|
| 0.105 | 0.00053 |
| 0.121 | 0.0012 |
| 0.145 | 0.0029 |
| 0.197 | 0.0098 |
| 0.2 | 0.011 |
| 0.272 | 0.027 |
| 0.4 | 0.08 |
| 0.6 | 0.19 |
| 0.8 | 0.36 |
| 0.9 | 0.47 |
| 1.0 | 0.60 |

In each case, λ is the wavelength in the supporting medium if any; otherwise, it is the free space or atmospheric wavelength, as appropriate.

In order to facilitate fabrication of metallic grids for employment in the infrared portion of the spectrum, I prefer the following range of parameters lying within the broad range specified above in Equation 1.

$$1.2(1+\sin \theta) < \lambda/a < 5.4 \cos \theta \quad (4)$$

In this relationship, the factor 1.2 provides a preferred margin with respect to the threshold for side diffraction lobes; while the factor 5.4 is preferred to the factor of 9 in Equation 1 because of practical considerations related to the width of the elements and the gaps therebetween, which are small near this limit.

Figure 3:
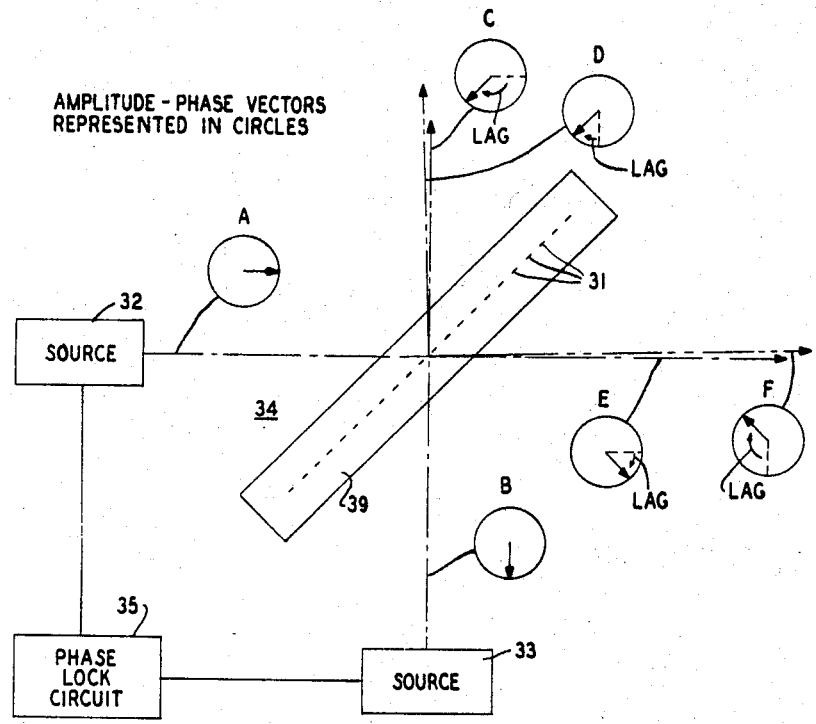
FIG. 3 is partially a schematic top view and partially a block diagrammatic showing of a preferred embodiment of the invention, vector diagrams A through F showing illustrative amplitude-phase vector relationships at the indicated points in the embodiment of FIG. 3.
Figure 4:
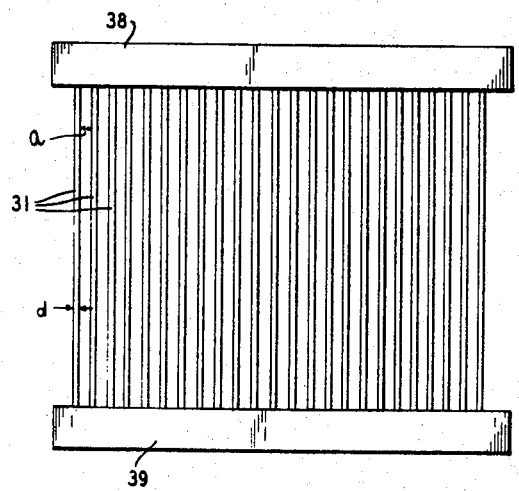
FIG. 4 is a pictorial front view of the metallic grid employed in the embodiment of FIG. 3.

The preferred embodiment of my invention is illustrated in FIG. 3. The metallic grid 34 comprising the elongated elements 31, viewed end-on, is of the general type called an unsupported grid. As may be seen from the front pictorial view shown in FIG. 4, the individual elements 31 are mounted at their ends in the metallic mounts 38 and 39. Incident upon grid 34 from sources 32 and 33 are two input beams both having electric field polarization parallel to the grid elements 31. The sources 32 and 33 are disposed to direct their beams at equal angles $\theta$ upon opposite sides of the grid, the reflected component of one being aligned with the transmitted component of the other.

For input radiations of 119μ, the grid elements 31 preferably have a width $d$ equal to 0.033 times 119μ or 3.93μ and a center-to-center spacing of 0.365 times 119μ or 43.4μ. The fabrication of such a grid without dielectric support is within the capabilities of the present state of the art. For example, such fine unsupported grids are now used in the television tube camera art and are commercially available.

Sources 32 and 33 are illustratively water vapor lasers of the type described by W. R. Bennett, Jr. in the article "Inversion Mechanisms in Gas Lasers," Applied Optic Supplement No. 2, Chemical Lasers (1965), p. 3ff, at p. 33. They operate at the wavelength of 118.65μ in the far infrared. The laser structures are of the type described by L. E. S. Mathias and A. Crocker, Physics Letters, 13, p. 35 (1964) or by A. Crocker et al., Nature, 201, p. 250 (1964).

For convenience in explaining the operation of the embodiment of FIG. 3 it is assumed that sources 32 and 33 are spaced from grid 34 so that the coherent wave of the beam of source 33 lags behind the coherent wave of the beam of source 32 by 90° in relative phase at grid 34; and it is assumed that sources 32 and 33 are locked in phase by the phase lock circuit 35, as disclosed in the copending application of Enloe et al., Ser. No. 421,774 filed Dec. 29, 1964 and assigned to the assignee hereof. This relationship is indicated by the amplitude-phase vector diagrams A and B, which indicate the relative phases of the incident waves at grid 34. It should be particularly noted that these amplitude-phase vectors should not be confused with the polarizations of the wave which are the same for both waves; that is, the electric field intensity vectors are parallel to the grid elements in FIG. 3. The reflected component of the wave from source 32, suffers a phase lag of 180° minus 45° leaving grid 34, as compared to the incident wave. The 45° component is explained above in connection with FIG. 2. This phase lag is illustrated in diagram C. The transmitted component of the wave from source 33 suffers a phase lag of 45° at grid 34 as compared to the incident wave from source 33 as shown in diagram D. Therefore, the two just-mentioned components are in phase, and their amplitudes add arithmetically. Since the amplitudes of the adding components are each proportional to the respective input amplitudes, the sum of the component amplitudes is proportional to the sum of the input amplitudes.

The reflected component of the wave from source 33 suffers an added phase lag of 180° minus 45° at grid 34, as compared to the incident wave of source 33 and as shown in diagram F. The transmitted component of the wave from source 32 suffers a phase lag of 45° at grid 34 as compared to the incident wave from source 32 and as shown in diagram E. Therefore, the two just-mentioned components are 180° out of phase as illustrated by diagrams E and F; and the smaller amplitude is subtracted from the larger. Since the component amplitudes are each proportional to the respective input amplitudes, the resulting component amplitude difference is proportional to the amplitude difference of the input amplitudes.

The foregoing example of operation has been given for 90° relative phase of the input waves in order to obtain collinear vector combination at the output. Nevertheless, in the general case in which input waves have a relative phase difference other than 90°, a vector sum and a vector difference will be the result of the two output combinations. As has been mentioned above, any two of the three input parameters i.e., the respective amplitudes or the relative phase, may be calculated if any one of them and the output amplitudes are measured. Moreover, the foregoing example of operation has been given for an inductive grid 34. For a capacitive grid 34 (waves polarized with electric field intensity vector orthogonal to the elements 31 and the gap between the elements now being 0.033 times 119$\mu$ and the element width $d$ being equal to (0.365–0.033) times 119$\mu$), the respective transmitted or reflected components corresponding to those described above suffer phase leads equal in magnitude to the phase lags specified above.

It may also be desirable to use the present invention for input radiations in the range from 8 to 14$\mu$, which is a so-called atmospheric window in the infrared portion of the spectrum. Specifically, for $\lambda$ equals 10.6$\mu$, D divided by $\lambda$ equals 0.33 and, approximately, $a$ divided by $\lambda$ equals 0.92, for an unsupported grid.

Figure 6:
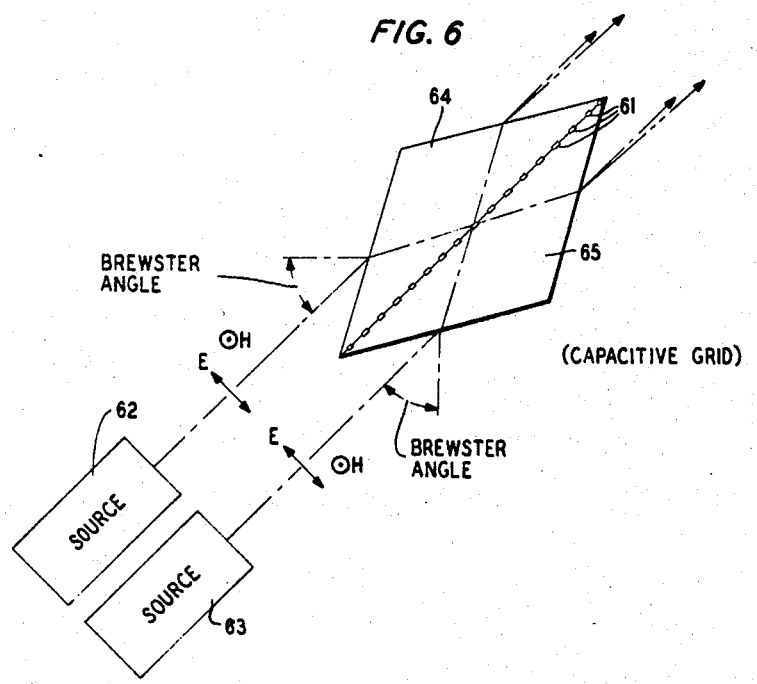
FIG. 6 shows a modification of the embodiment of FIG. 5 to employ Brewster-angle entrance and exit faces on the dielectric supporting material instead of an anti-reflection coating.

Such an unsupported grid is more difficult to fabricate than the unsupported grid described heretofore. Therefore, I prefer in such a case to use the alternative of a supported grid as illustrated in FIGS. 5, 6 or 7A, B, and C.

In the supported grid shown in FIG. 5, the grid elements 51 are deposited on the broad face of a right-angle prism of silicon 55 such that the other faces of the block are orthogonal to the directions of one of the proposed input radiations and one of the proposed output radiations. The grid elements 51 may be deposited on block 55 by a so-called photoresist technique such as that disclosed in Derick et al. Patent No. 2,802,760, issued Aug. 13, 1957, or by any other thin film technique. Another right-angle prism of silicon 54 then has its broad face pressed against the grid elements 51 with sufficient pressure that a smooth silicon-to-silicon interface is formed. Alternatively, an air-to-silicon interface may be avoided by growing additional crystalline silicon between elements 51 on the face of block 55 before block 54 is pressed against that face. Either of these techniques may also be used in the modified embodiments of FIG. 7 and FIG. 8, described hereinafter.

An antireflection coating 56 is either predeposited on the other surfaces on silicon block 54 or is deposited as a final step in fabrication in order to prevent unwanted reflections on the surfaces through which radiation will pass. Similarly, the exposed surfaces of block 55 through which the radiation is intended to pass are coated with antireflection coatings. Illustratively, these coatings may be silicon monoxide grown on the surface of the silicon and having an index of refraction of about 1.84. It will be seen that this construction avoids oblique incidence at dielectric interfaces at which reflections tend to occur and avoids altogether an interface between different dielectrics in the plane of the wire grid.

For 10.6$\mu$ radiation, such as that provided by lasers of the type disclosed in the copending application of C. K. N. Patel Serial No. 474,546, filed July 26, 1965 and assigned to the assignee hereof, and for an inductive grid as shown in FIG. 5, the parameter $d/\lambda$ preferably equals 0.12 and $a/\lambda$ equals 0.6. These values are greater than those specified above for an unsupported grid because the index of refraction of silicon is 3.4, so that the wavelength of the laser radiation within the silicon is altered accordingly.

One can eliminate the dielectric coatings 56 and 57 if one disposes the entrance and exit surfaces of the dielectric at the Brewster angle with respect to the input radiation in a plane such that the electric field intensity vector is oblique to the surface. Thus, in FIG. 6, for the case in which the electric field intensity vector is orthogonal to the grid elements 61 as shown, the resulting supporting structure including the silicon blocks 64 and 65 assumes the shape of a parallelepiped of which at least two faces are rhombs; it is seen that the radiations from sources 62 and 63 are incident upon blocks 64 and 65, respectively, so that they will intersect the grid elements 61 from opposite sides. The Brewster angle appears between the path of the beam and the normal to each of the entrance and exit surfaces. Within the supporting structure, the plane of incidence of each beam is still orthogonal to the direction of elongation of the grid elements. Inasmuch as the electric field intensity is also normal to the grid elements, the grid comprising elements 61 is a capacitive grid; and the values of the element width and the gap therebetween will now be interchanged, the center-to-center spacing remaining unchanged. Specifically, the gap between the elements 61 divided by $\lambda$ is 0.12 and $a/\lambda$ is still 0.6.

To apply the principles of Brewster-angle entrance and exit surfaces to a supported inductive grid, we must use a parallelepiped that is rhomboidal in two dimensions, i.e., at least four faces are rhombs, as illustrated in FIGS. 7A, 7B and 7C. In this case, the parameters of the grid elements 71 are the same as for the grid elements 51 of FIG. 5. Blocks 74 and 75 are illustratively silicon. It will be seen that the radiations from sources 72 and 73 have electric field vectors parallel to the grid elements 71. In the embodiment of FIGS. 7A, 7B, and 7C within the supporting structure the plane of incidence of the beams upon the grid is still orthogonal to the grid.

An arrangement for employing a grid at normal incidence as a magic tee is shown in FIG. 8.

The elements 91 comprise an unsupported grid of the type described above in connection with FIGS. 3 and 4. Incident in the normal direction thereupon are input beams supplied by coherent radiation sources 92 and 93 and transmitted through circulators 94 and 95 respectively. The vector sum and difference beams are supplied at the lateral output ports of circulators 94 and 95.

The circulators 94 and 95 are illustratively of the type described in the article "An Optical Circulator" by William B. Ribberns, Applied Optics, 4, 1037, August 1965, with the modification that the Faraday rotators are of the type described in the copending application of P. L. Richards et al., Ser. No. 334,146, filed Dec. 30, 1963, and assigned to the assignee hereof. The fourth port is of no interest in each case, since only one polarization of input radiation is supplied by each of sources 92 and 93.

In operation, the grid comprising elements 91 splits each of the input beams, one half of each being transmitted and one half of each being reflected. The reflected and transmitted components traveling in the same direction have their polarizations rotated by 45° within one of the circulators so that they are reflected by a wire grid polarizer into one of the indicated output ports of the circulator.

In this embodiment, the angle of incidence, $\theta$, is zero degrees (0°); and curve 11 of FIG. 1 may be used directly in choosing an appropriate grid.

Various modifications of the invention should be obvious to one skilled in the art. For example, grid elements may be formed on dielectric substrates of the type described in FIGS. 5, 6, 7A, 7B and 7C by conventional photoengraving or by light-sensitive gas-phase etching of the type disclosed in Patent 3,122,463 to J. R. Ligenza et al. issued Feb. 25, 1964.

In all cases, the above-described arrangements are illustrative of a small number of the many possible specific embodiments that can represent applications of the principles of the invention. Numerous and varied other arrangements can be devised in accordance with these principles by those skilled in the art without departing from the spirit and scope of the invention.

What is claimed is:

1. Apparatus comprising first and second sources propagating input radiant energy beams with like polarization and wavelength towards a region of intersection and a metallic grid disposed at said intersection and having parallel elongated elements of width $d$ nonobliquely oriented with respect to said polarization, the normal to the plane of said grid being oriented at an angle $\theta$ with respect to the directions of each of said beams to provide like propagation directions for the transmitted component of one of said beams and the reflected component of the other, the angle $\theta$ lying in a plane orthogonal to the direction of elongation of said elements, the ratio of each wavelength, $\lambda$, to the element center-to-center spacing, $a$, lying in the range $1 + \sin \theta < \lambda/a < 9 \cos \theta$, the ratio of $a$ to the grid parameter D being appropriate for splitting the beam into equal transmitted and reflected components, where D is $d$ when the elements are elongated parallel to the polarization and D is $(a-d)$ when the elements are elongated orthogonal to the polarization.

2. Apparatus according to claim 1 in which the ratio of each wavelength, $\lambda$, to the element center-to-center spacing, $a$, lies in the range $$1.2(1+ \sin \theta) < \lambda/a < 5.4 \cos \theta$$

3. Apparatus according to claim 1 in which the grid elements are metallic conductive elements that present a thickness to the beams that is much less than the width $d$, the grid also including a transparent substrate upon which said elements are mounted.

4. Apparatus according to claim 3 in which the transparent substrate is disposed on both sides of said grid and provides entrance and exit faces for radiation which are orthogonal to the directions of propagation of said radiations, antireflection coatings being deposited upon said entrance and exit faces.

5. Apparatus according to claim 3 in which the transparent substrate is disposed upon both sides of the grid in the form of a parallelepiped to provide entrance and exit surfaces at the Brewster angle with respect to the directions of propagation of the radiations.

6. Apparatus according to claim 3 in which the transparent substrate is deposited upon both sides of said grid as a rhomboidal parallelepiped and provides entrance and exit surfaces at Brewster angle with respect to the radiations.

7. Apparatus according to claim 1 in which $a \cos \theta/\lambda$ is related to $D \cos \theta/\lambda$ according to a smooth function of which the following points are substantially representative:

| $a \cos \theta/\lambda$: | $D \cos \theta/\lambda$ |
|---|---|
| 0.105 | 0.00053 |
| 0.121 | 0.0012 |
| 0.145 | 0.0029 |
| 0.197 | 0.0098 |
| 0.2 | 0.011 |
| 0.272 | 0.027 |
| 0.4 | 0.08 |
| 0.6 | 0.19 |
| 0.8 | 0.36 |
| 0.9 | 0.47 |
| 1.0 | 0.60 |

8. Apparatus according to claim 7 in which the angles $\theta$ are zero degrees, said apparatus including first and second circulators disposed between the first and second sources, respectively, and the metallic grid.

References Cited

UNITED STATES PATENTS 2,788,440    4/1957    Ramsay et al.

DAVID SCHONBERG, *Primary Examiner.*

PAUL R. MILLER, *Assistant Examiner.*

U.S. Cl. X.R.

350—150, 152, 160, 169, 172